United States Patent
Andrews

(10) Patent No.: US 9,328,259 B1
(45) Date of Patent: May 3, 2016

(54) ELASTOMERIC SILICONE EMULSION FOR COATING APPLICATIONS

(71) Applicant: WACKER CHEMICAL CORPORATION, Adrian, MI (US)

(72) Inventor: Amanda Andrews, Petersburg, MI (US)

(73) Assignee: WACKER CHEMICAL CORPORATION, Adrian, MI (US)

( * ) Notice: Subject to any disclaimer, the term of this patent is extended or adjusted under 35 U.S.C. 154(b) by 0 days.

(21) Appl. No.: 14/617,195

(22) Filed: Feb. 9, 2015

(51) Int. Cl.
| | |
|---|---|
| *C09D 171/02* | (2006.01) |
| *C09D 183/06* | (2006.01) |
| *C09D 183/04* | (2006.01) |
| *C08L 83/06* | (2006.01) |
| *C08L 71/02* | (2006.01) |

(52) U.S. Cl.
CPC ............ *C09D 171/02* (2013.01); *C09D 183/04* (2013.01); *C09D 183/06* (2013.01); *C08L 71/02* (2013.01); *C08L 83/06* (2013.01)

(58) Field of Classification Search
None
See application file for complete search history.

(56) References Cited

U.S. PATENT DOCUMENTS

| | | | |
|---|---|---|---|
| 4,833,178 A | 5/1989 | Schaefer et al. | |
| 6,884,852 B1 | 4/2005 | Klauck et al. | |
| 7,319,128 B2 | 1/2008 | Ziche et al. | |
| 7,332,541 B2 | 2/2008 | Schindler et al. | |
| 7,977,445 B2 * | 7/2011 | Hattemer ............ | C08G 18/2865 524/506 |
| 8,101,704 B2 | 1/2012 | Baumann et al. | |
| 2007/0167598 A1 | 7/2007 | Stanjek et al. | |
| 2012/0208029 A1 * | 8/2012 | Lin ...................... | C09D 183/08 428/413 |
| 2013/0034514 A1 * | 2/2013 | Schweinsberg .......... | A61K 8/86 424/70.12 |
| 2015/0009566 A1 * | 1/2015 | Iyer ...................... | C09D 183/04 359/538 |

FOREIGN PATENT DOCUMENTS

| | | |
|---|---|---|
| EP | 1 093 482 B1 | 4/2001 |
| EP | 1 641 854 B1 | 4/2006 |
| EP | 1 535 940 A1 | 6/2006 |
| EP | 1 896 523 B1 | 3/2008 |
| WO | 2007072189 A2 | 6/2007 |

* cited by examiner

*Primary Examiner* — Marc Zimmer

(74) *Attorney, Agent, or Firm* — Brooks Kushman P.C.

(57) ABSTRACT

Emulsions of silicone terminated polyethers are used to modify paints and coatings over masonry, plaster, cellulous, and EIFS substrates to increase flexibility, water repellency, and elastomeric properties of the paints and coatings to protect the paint and coating substrates from cracking due to moisture penetration. The modified paints and coatings are also used as anti-graffiti paint.

21 Claims, No Drawings

ELASTOMERIC SILICONE EMULSION FOR COATING APPLICATIONS

BACKGROUND OF THE INVENTION

1. Field of the Invention

The present invention pertains to modifying paints and coatings with elastomeric silicone emulsions.

2. Description of the Related Art

Most building materials are porous, which subjects them to wetting from the outside, for example by rain. If the pores of the building material are filled with water, insulation properties of the material are adversely affected. Prolonged wetting also leads to moisture damage. Various coatings over masonry, plasters, cellulose and exterior insulation and finishing system (EIFS) have been developed, but a large number of the coatings have tendency to become brittle. Brittleness leads to cracking of the coatings, leaving a coating film with large surface cracks that are not functional and are unappealing. If water enters the coatings or substrate during freeze and thaw cycles, this can also lead to cracking.

Graffiti on buildings and structures has also become a significant problem. Various anti-graffiti materials have been developed to be either resistant to the application of spray paint and marker pens or to aid in the removal of graffiti. Such anti-graffiti materials do not provide satisfactory results and/or are expensive.

Therefore, there has been a long felt need to address failure of others to solve the above-mentioned problems. Specifically, there has been a long felt need to increase flexibility and water repellency of such coating applications as well as to develop a paint or coating as one-part and two-part paint systems with excellent tensile strength, elongation, and water repellency. Finally, there has been a long felt need to develop an effective anti-graffiti coating with excellent water repellency and flexibility.

SUMMARY

It has now been surprisingly and unexpectedly discovered that stable emulsions of silicone terminated polyethers can be used to modify paints and coatings over masonry, plaster, cellulose and EIFS substrates. Modifying the paints and coating with the stable emulsions increases flexibility and elastomeric properties of the paints and coatings. Additionally, the modification also results in excellent water repellency which protects the paint and coating substrates from cracking due to moisture penetration. Furthermore, it has now been surprisingly and unexpectedly discovered that paints or coatings modified with stable emulsions of silicone terminated polyethers exhibit good overcoating capabilities and can be used as effective anti-graffiti coatings.

DETAILED DESCRIPTION

The paints and coatings to be modified may be any paint or coating suitable for interior and/or exterior use, such as coatings over masonry, plasters, cellulose, and EIFS substrates. The paints and coatings for purposes of the current invention mean any liquid, liquefiable, or mastic composition, which converts to a solid film after application to a substrate. The paints and coatings may be solvent-based such as oil based or alkyd based; water-based such as aqueous emulsion/latex paints or acrylic paints; high-solids paints with low volatile organic compound content; powder coatings; or radiation curable coatings.

The paint or coating to be modified with the stable emulsions of silicone terminated polyethers may contain one or more of the following components: a binder, a diluent and/or solvent, pigments and/or fillers, and additives.

The binder is a film-forming component of the paint responsible for good adhesion of the coating to the substrate. The binder may include natural or synthetic resins such as alkyds, acrylics, vinyl, vinyl-acrylics, styrene acrylic, vinyl acetate/ethylene, phenol/formaldehyde condensates, polyurethanes, polyesters, nitrocellulose, polyamide, melamine resins, epoxy, or polymerizable oils. A specific example of a binder may be a water dilutable solventless emulsion of a silicone resin or a solventless water-thinnable emulsion of a polysiloxane modified with functional silicone resin or a water dilutable siloxane.

The diluent or solvent serves as a medium in which the binder, pigments, and additives are dispersed and/or adjusts the viscosity of the paint. The diluent may be water, organic solvents such as aliphatic compounds, aromatic compounds, alcohols, ketones, mineral spirits, turpentine, and the like. Specific examples of a solvent may be petroleum distillate, esters, glycol esters, xylene, toluene, ethylbenzene, n-butyl acetate, n-butanol, isopropanol, 2-butoxyethanol, dimethylformamide, methyl ethyl ketone, naphthalene, the like or a combination thereof. The diluent may also be a reactive diluent which reacts with other binder components or with the elastomeric silicone.

Pigments may be used to contribute color or opacity, protect the substrate from UV light, increase hardness, decrease ductility, and/or adjust gloss level. The pigments may be synthetic or natural. Examples of pigments may include clays, calcium carbonate, mica, silicas, talcs, calcined clays, blanc fixe, precipitated calcium carbonate, synthetic pyrogenic silicas, the like, or a combination thereof.

Examples of inorganic pigments may include aluminum pigments such as silicates of sodium and aluminum containing sulfur (ultramarine violet) and a complex naturally occurring pigment of sulfur-containing sodio-silicate ($Na_{8-10}Al_6Si_6O_{24}S_{2-4}$) (ultramarine); barium copper pigments such as Chinese purple ($BaCuSi_2O_6$) and dark blue ($BaCu_2Si_2O_7$), copper pigments such as a synthetic pigment of calcium copper silicate ($CaCuSi_4O_{10}$), cupric acetoarsenite ($Cu(C_2H_3O_2)_2.3Cu(AsO_2)_2$); barium pigments such as barium sulfate ($BaSO_4$.); manganese pigments such as manganic ammonium pyrophosphate ($NH_4MnP_2O_7$); cobalt pigments such as cobalt stannate ($CoO_3Sn$), potassium cobaltinitrite ($Na_3Co(NO_2)_6$), cobalt chromite ($CoCr_2O_4$), cobalt titanate ($Co_2TiO_4$); iron pigments such as a synthetic pigment of ferric hexacyanoferrate ($Fe_7(CN)_{18}$), a naturally occurring clay of monohydrated ferric oxide ($Fe_2O_3.H_2O$), anhydrous $Fe_2O_3$; cadmium pigments such as cadmium sulfide (CdS), cadmium sulfoselenide ($Cd_2SSe$), cadmium selenide (CdSe); chromium pigments such as chromic oxide ($Cr_2O_3$), a pigment of hydrated chromic oxide ($Cr_2O_3.H_2O$), natural pigment of plumbous chromate ($PbCrO_4$), a naturally occurring pigment mixture composed of lead (II) chromate and lead(II) oxide ($PbCrO_4+PbO$); arsenic pigments such as monoclinic arsenic sulfide ($As_2S_3$); lead pigments such as lead antimonite ($Pb(SbO_3)_2$, basic plumbous carbonate (($PbCO_3)_2.Pb(OH)_2$); mercury pigments such as mercuric sulfide (HgS); carbon pigments such as carbon black; antimony pigments such as stibous oxide ($Sb_2O_3$); zinc pigments such as zinc oxide (ZnO) or zinc chromate ($ZnCrO_4$); titanium pigments such as nickel antimony titanium yellow rutile ($NiO.Sb_2O_3.20TiO_2$) or titanium dioxide ($TiO_2$); a complex sulfur-containing sodio-silicate ($Na_{5-10}Al_6Si_6O_{24}S_{2-4}$) containing lazurite known as ultramarine blue, or the like.

Examples of organic pigments may include diarylide aniline yellow pigment; benzimidazole yellow dyes; heterocyclic yellow dyes; disazo condensation yellow dyes such as arylide yellow, isoindoline yellow, methane yellow, tetrachloroisoindolinone yellow, azomethine yellow, quinophthalone yellow, or triazinyl yellow, naphthol orange, calrion red, benzimidazolone orange; phthalocyannine green dyes with chemical formula ranging from $C_{32}H_3Cl_{13}CuN_8$ to $C_{32}HCl_{15}CuN_8$, copper phthalocyannine; 8,18-dichloro-5,15-diethyl-5,15-dihydrodiindolo(3,2-b:3',2'-m)tri-phenodioxazine known as diooxazine violet, or the like.

Pigments may include hiding pigments protecting the substrate from UV light such as titanium dioxide, optionally coated with silica/alumina/zirconium, phthalocyannine blue dye, or red iron oxide.

Fillers may be used for thickening of the film, reinforcing the binder, giving the paint texture, and/or increasing the paint volume. The fillers may include diatomaceous earth, talc, lime, barytes such as barium sulfate, clay, kaolin clay, precipitated or ground calcium carbonate, chalk, limestone, marble, magnesium carbonate, dolomite, fine quartz, silicates, the like, or a combination thereof.

Additives may serve a variety of functions such as to modify surface tension, flow and leveling properties, appearance, gloss, texturing, increase wet edge and/or antifreeze properties, improve pigment stability, control foaming and/or skinning, modify rheology, modify mar resistance, act as catalysts, driers, thickeners, stabilizers, emulsifiers, texturizers, adhesion promoters, UV stabilizers, corrosion inhibitors, texturizers, de-glossing agents, biocides, fungicides, insecticides, algaecides, the like, or a combination thereof.

Examples of additives may be silicone polyether copolymers, a dispersion of high molecular weight polysiloxane or polydimethylsiloxane and silicone surfactant as additives increasing mar resistance and providing or improving slip; ethylene oxide surfactants; silicone emulsions, fluorosilicone, organo-modified silicone copolymers as additives providing foam control; aminopropyltriethoxysilane, 3-methacryloxypropyltrimethoxysilane, cationic vinylbenzyl and amino-functionalmethoxy-silane, glycidoxypropyltrimethoxysilane, silanol-functional additives, aqueous solutions of amino-functional silicone polymers as adhesion promoters and pigment treatment additives; silane/siloxane blends as additives promoting water resistance; arylalkyl-modified silicone, silicone polyether copolymers as additives improving leveling and gloss; silicone elastomer particles with epoxy functionality improving abrasion resistance and adding a smooth, matter finish; silicone polyether copolymers as additives enhancing substrate wetting; 2,2'-(2,5-thiophenediyl)bis(5-tert-butylbenzoxazole) as an optical brightener; 2-[2-hydroxy-3,5-di-(1,1-dimethylbenzyl)]-2H-benzotriazole, 2-(2H-benzotriazole-2-yl)-4-methylphenyl as UV light absorbers; tris(2,4-di-tert-butylphenyl)phosphite, stearyl-3-(3',5'-di-tert-butyl-4-hydroxyphenyl) propionate, 2,2'-methylenebis (4-methyl-6-tert-butylphenol) as stabilizers; tetrachloroizo phthalonitrile, 3-iodo-2-propynyl butyl carbamate, 2-n-octyl-4-isothiazolin-3-one, diiodomethyl-p-tolysulphone, N-(trimethylthio) phtalamine, 1,2-benzisothiazolin-3-one as biocides; 2-(4-thiazolyl(benzimidazole), dichloroctylisothiazolone as fungicide/algaecide; potassium sodium phosphate as a buffer; hydrophobic copolymer polyelectrolyte as a pigment dispersant; modified hydroxyethyl methyl cellulose, as a thickener; modified polyols as foam suppressors; ester alcohol as a coalescent; calcium carbonate as an extender; talc as an additive to provide pigment spacing, firmness, anti-cracking, and barrier properties; aqueous butyl acrylate-styrene copolymer for dispersion; and (N-(2-aminoethyl)-3-aminopropyltrimethoxysilane, and aqueous acetic acid as catalysts. Any other additive for interior and exterior paint is also contemplated.

The elastomeric silicone emulsions to be added as modifiers to a paint or a coating are oil-in-water emulsions. Such emulsions are produced by dispersion of an organopolysiloxane ("silicone") into water with the aid of a surfactant or dispersing aid. A large number of different types of surfactants, or "emulsifiers" may be used, including anionic surfactants, cationic surfactants, zwitterionic surfactants, and non-ionic surfactants, particularly the latter. Partially hydrophobic inorganic particles in the nanometer size range may also be used, these particles containing both hydrophobic and hydrophilic portions which mimic conventional surfactant structure.

The emulsions to be added as modifiers to a paint or a coating may be emulsions containing essentially silyl-terminated polymers and alkoxy-silicone compounds of the formula:

(A) a silyl-terminated polymer of formula (I)

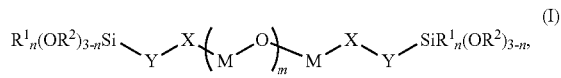

wherein
$R^1$=alkyl, aryl, preferably the methyl radical,
$R^2=C_1$-$C_{12}$-alkyl, preferably the methyl or ethyl radical, glycols, H, or aryl,
X=O, $NR^3$, $R^3$=H, $C_1$-$C_{12}$ alkyl or aryl, preferably X=O,
Y=—$(CH_2)_3$—, —$(CH_2)_3NHC(=O)$—, —$CH_2$,
—$CH_2NHC(=O)$—, wherein Y is Si—C bonded, preferably
Y=—$(CH_2)_3NHC(=O)$—, —$CH_2NHC(=O)$—, more preferably Y=—$CH_2NHC(=O)$—,
M=independently —$CH_2CH_2$—, —$CH_2CH(CH_3)$—, —$CH_2CH_2CH_2CH_2$—, preferably —$CH_2CH(CH_3)$—, wherein a majority of all M is —$CH_2CH(CH_3)$—, majority meaning ≥50%; preferably M is —$CH_2CH(CH_3)$— for ≥60%, ≥70%, ≥80%, or ≥90% of all M;
n=0-2, preferably 1;
m=1-500, preferably 10-30;

optionally (B) a silicone compound containing units of the formula (II)

a=0-3, preferably 1,
b=0-2, preferably 0,
c=0, 1, 2, or 3, preferably 3,
$R^4$=alkyl, aryl, aminoalkyl, glycidoxy alkyl, mercapto alkyl,
$R^5$=alkyl, aryl,
$R^6$=alkyl, H, ethylene oxide, propylene oxide,
with the proviso that a+b+c≤4, corresponding to oligomers, polymers, and silanes; preferably, a+b+c≤4, corresponding to oligomers or polymers; and
optionally (C) emulsifier(s);
(D) water;
further optionally:
(E) catalyst(s);
(F) filler(s); and
(G) other additive(s).

Specific examples of emulsions useful as paint or coating modifiers may consist of the following component (A), a silane-terminated polymer binder: dimethoxymethylsilylmethylcarbamate-terminated polyether with methoxy group content of approx.0.25-0.3 mmol/g or 0.4-0.5 mmol/g of the structural formula:

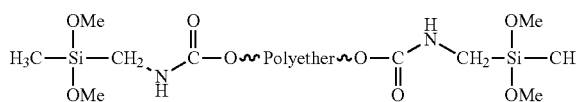

This silane-terminated polyether with dimethoxymethylsilylmethylcarbamate terminal groups is a clear, colorless viscous oil, which hydrolyzes in the presence of moisture to form silanols, which can then react with themselves to produce stable siloxane bonds. The close proximity of the nitrogen atom to the silicone atom in the dimethoxymethyl-silylmethylcarbamate group greatly accelerates hydrolysis of the alkoxysilyl groups. The silane-terminated polyether may have a molecular weight of 12,000 g/mol-18,000 g/mol and viscosity of 10,000 cps-30,000 cps.

The emulsions may alternatively include the following exemplary silane-terminated polymer binders, as component (A), either alone or in a combination: trimethoxysilylpropylcarbamate-terminated polyether with a methoxy content of about 0.5-0.7 mmol/g or about 0.35-0.45 mmol/g. The wt % of the polymer binder may be about 15-60% of the total formulation weight, more preferably about 40-55%, most preferably about 52%.

The dimethoxymethylsilylmethylcarbamate-terminated polyether used in the examples below has the following properties: density 1.0069 g/cm$^3$ at 20° C. measured according to DIN 51757, flash point 98° C. measured according to ISO 2719, dynamic viscosity about 10,000 mPas at 25° C. measured according to DIN 51562, and methoxy group content of about 0.4-0.5 mmol/g. Another dimethoxymethylsilylmethylcarbamate-terminated polyether used in the examples below, denoted as dimethoxymethylsilylmethylcarbamate-terminated polyether 2, has the following properties: density 1.0064 g/cm$^3$ at 25° C. measured according to DIN 51757, flash point>250° C. measured according to ISO 2592, dynamic viscosity about 10,000 mPas at 25° C. measured according to DIN 51562, and methoxy group content of about 0.5-0.7 mmol/g.

The emulsions may also consist of a combination of a polymer binder, component (A), such as dimethoxymethylsilylmethylcarbamate-terminated polyether and one or more silicone resins, component (B), such as solventless, reactive, methoxyfunctional methyl-phenyl polysiloxanes with a narrow molecular weight distribution, which are highly suitable for introducing a compatible silicone component into other binder systems to increase the weathering or heat resistance. The methoxyfunctional methyl-phenyl polysiloxane is a clear liquid with total silicone content of about greater than 98 wt. %, alkoxy content of about 15 wt. %, and solvent content of less than 2 wt. %. The wt % of the silicone resin in the premix with the polymer binder may be about 20-70%; preferably about 40-60%.

The emulsions may alternatively include the following exemplary silicone resins as component B: $(MeSiO_{3/2})_{0.88}(MeSi(OH)O_{2/2})_{0.05}(MeSi(OEt)O_{2/2})_{0.06}(Me_2SiO_{2/2})_{0.01}$ with Mw=6600 g/mol, Mn=2000 g/mol and Mw/Mn=3.3;

$(MeSiO_{3/2})_{0.86}(MeSi(OH)O_{2/2})_{0.02}(MeSi(OEt)O_{2/2})_{0.10}(Me_2SiO_{2/2})_{0.02}$ with Mw=10000 g/mol, Mn=2300 g/mol and Mw/Mn=4.3;

$(MeSiO_{3/2})_{0.71}(MeSi(OH)O_{2/2})_{0.03}(MeSi(OEt)O_{2/2})_{0.05}(Me_2SiO_{2/2})_{0.21}$ with Mw=4500 g/mol, Mn=1900 g/mol and Mw/Mn=2.4;

$(MeSiO_{3/2})_{0.88}(MeSi(OH)O_{2/2})_{0.05}(MeSi(OMe)O_{2/2})_{0.06}(Me_2SiO_{2/2})_{0.01}$ with Mw=9000 g/mol, Mn=2300 g/mol and Mw/Mn=3.9;

$(MeSiO_{3/2})_{0.33}(MeSi(OH)O_{2/2})_{0.05}(MeSi(OEt)O_{2/2})_{0.01}(Me_2SiO_{2/2})_{0.06}$ $(PhSiO_{3/2})_{0.24}(PhSi(OH)O_{2/2})_{0.28}(PhSi(OEt)O_{2/2})_{0.03}$ with Mw=3250 g/mol, Mn=1300 g/mol and Mw/Mn=2.5;

$(MeSiO_{3/2})_{0.34}(MeSi(OH)O_{2/2})_{0.03}(MeSi(OEt)O_{2/2})_{0.02}$ $(PhSiO_{3/2})_{0.45}$ $(PhSi(OH)O_{2/2})_{0.13}(PhSi(OEt)O_{2/2})_{0.03}$ with Mw=4700 g/mol, Mn=1800 g/mol and Mw/Mn=2.6;

$(MeSiO_{3/2})_{0.27}(MeSi(OH)O_{2/2})_{0.03}(PhSiO_{3/2})_{0.34}(PhSi(OH)O_{2/2})_{0.14}$ $PhSi(OEt)O_{2/2})_{0.02}(PhMeSiO_{2/2})_{0.17}(PhMeSi(OH)O_{1/2})_{0.03}$ with Mw=2400 g/mol, Mn=1200 g/mol und Mw/Mn=2.0;

$(PhSiO_{3/2})_{0.45}(PhSi(OH)O_{2/2})_{0.44}PhSi(OEt)O_{2/2})_{0.09}$ $(PhSi(OH)_2O_{1/2})_{0.02}$ with Mw=2900 g/mol, Mn=1500 g/mol and Mw/Mn=1.9;

$(PhSiO_{3/2})_{0.48}(PhSi(OH)O_{2/2})_{0.17}(PhSi(OEt)O_{2/2})_{0.02}$ $(CH_3(CH_2)_2SiO_{3/2})_{0.25}(CH_3(CH_2)_2Si(OH)O_{2/2})_{0.08}$ with Mw=1800 g/mol, Mn=1250 g/mol and Mw/Mn=1.4;

$(MeSiO_{3/2})_{0.32}(MeSi(OH)O_{2/2})_{0.06}(MeSi(OEt)O_{2/2})_{0.01}(Me_2SiO_{2/2})_{0.06}$ $(PhSiO_{3/2})_{0.23}(PhSi(OH)O_{2/2})_{0.29}(PhSi(OEt)O_{2/2})_{0.03}$ with Mw=1700 g/mol, Mn=1200 g/mol und Mw/Mn=1.4;

$(PhSiO_{3/2})_{0.50}(PhSi(OH)O_{2/2})_{0.15}(PhSi(OEt)O_{2/2})_{0.02}$ $(CH_3(CH_2)_2SiO_{3/2})_{0.26}$ $(CH_3(CH_2)_2Si(OH)O_{2/2})_{0.07}$ with Mw=2800 g/mol, Mn=1200 g/mol und Mw/Mn=2.3;

$(MeSiO_{3/2})_{0.81}(MeSi(OH)O_{2/2})_{0.04}(MeSi(OEt)O_{2/2})_{0.05}$ $(Me_2SiO_{2/2})_{0.10}$ with Mw=6500 g/mol, Mn=1900 g/mol und Mw/Mn=3.4; where Me is the methyl radical, Et is the ethyl radical, and Ph is the phenyl radical.

Further non-limiting examples of component B are: $(SiO_{4/2})_{0.50}(Me_3SiO_{1/2})_{0.39}(Si(OEt)O_{3/2})_{0.06}(Si(OEt)_2O_{2/2})_{0.02}(Si(OEt)_3O_{1/2})_{0.01}(Si(OH)O_{3/2})_{0.02}$ with Mw=7400 g/mol, Mn=3100 g/mol and Mw/Mn=2.4;

$(SiO_{4/2})_{0.46}(Me_3SiO_{1/2})_{0.43}(Si(OEt)O_{3/2})_{0.07}(Si(OEt)_2O_{2/2})_{0.02}—(Si(OEt)_3O_{1/2})_{0.01}(Si(OH)O_{3/2})_{0.01}$ with Mw=1400 g/mol, Mn=900 g/mol and Mw/Mn=1.6;

$(SiO_{4/2})_{0.46}(Me_3SiO_{1/2})_{0.37}(ViMe_2SiO_{1/2})_{0.06}(Si(OEt)O_{3/2})_{0.07}$ $(Si)OEt)_2O_{2/2})_{0.02}—(Si(OEt)_3O_{1/2})_{0.01}(Si(OH)O_{3/2})_{0.04}$ with Mw=5300 g/mol, Mn=2600 g/mol and Mw/Mn=2.0;

$(SiO_{4/2})_{0.38}(Me_3SiO_{1/2})_{0.4}(ViMe_2SiO_{1/2})_{0.06}(Si(OEt)O_{3/2})_{0.07}$ $(Si(OEt)_2O_{2/2})_{0.02}—(Si(OEt)_3O_{1/2})_{0.01}(Si(OH)O_{3/2})_{0.04}$ with Mw=2600 g/mol, Mn=1600 g/mol and Mw/Mn=1.6;

$(MeSiO_{3/2})_{0.37}(MeSi(OEt)O_{2/2})_{0.46}(MeSi(OEt)_2O_{1/2})_{0.17}$ with Mw=2400 g/mol, Mn=900 g/mol and Mw/Mn=2.7;

$(MeSiO_{3/2})_{0.37}(MeSi(OH)O_{2/2})_{0.01}(MeSi(OEt)O_{2/2})_{0.46}(MeSi(OEt)_2O_{1/2})_{0.15}-(Me_2SiO_{2/2})_{0.01}$ with Mw=2400 g/mol, Mn=900 g/mol and Mw/Mn=2.7;

$(MeSiO_{3/2})_{0.29}(MeSi(OH)O_{2/2})_{0.01}(MeSi(OMe)O_{2/2})_{0.47}(MeSi(OMe_2)O_{1/2})_{0.23}$ with Mw=2300 g/mol, Mn=600 g/mol a Mw/Mn=3.8;

$(MeSiO_{3/2})_{0.32}(MeSi(OMe)O_{2/2})_{0.48}(MeSi(OMe)_2O_{1/2})_{0.20}$ with Mw=3300 g/mol, Mn=900 g/mol and Mw/Mn=3.7; $(PhSiO_{3/2})_{0.23}(PhSi(OMe)O_{2/2})_{0.51}(PhSi(OMe)_2O_{1/2})_{0.26}$ with Mw=1000 g/mol, Mn=700 g/mol and Mw/Mn=1.4;

$(MeSiO_{3/2})_{0.01}(MeSi(OMe)O_{2/2})_{0.17}(MeSi(OMe)_2O_{1/2})_{0.03}(PhSiO_{3/2})_{0.15}$ $(PhSi(OMe)O_{2/2})_{0.31}(PhSi(OMe)_2O_{1/2})_{0.20}(Me_2SiO_{2/2})_{0.04}$ with Mw=1800 g/mol, Mn=900 g/mol and Mw/Mn=2.0;

$(MeSiO_{3/2})_{0.10}(MeSi(OMe)O_{2/2})_{0.15}(MeSi(OMe)_2O_{1/2})_{0.03}-(MeSi(O(CH_2)_3CH_3)O_{2/2})_{0.03}(PhSiO_{3/2})_{0.15}(PhSi(OMe)O_{2/2})_{0.24}—(PhSi(OMe)_2O_{1/2})_{0.15}(PhSi(O(CH_2)_3CH_3)O_{2/2})_{0.06}$ $(PhSi(OMe)(O(CH_2)_3CH_3)O_{1/2})_{0.04}(PhSi(O(CH_2)_3CH_3)_2O_{1/2})_{0.01}(Me_2SiO_{2/2})_{0.04}$ with Mw=1400 g/mol, Mn=800 g/mol and Mw/Mn=1.8;

(i-OctSi(OMe)(OH)O$_{1/2}$)$_{0.01}$(i-OctSi(OMe)O$_{2/2}$)$_{0.10}$(i-OctSi-(OMe)$_2$O$_{1/2}$)$_{0.16}$(MeSiO$_{3/2}$)$_{0.26}$(MeSi(OMe)O$_{2/2}$)$_{0.36}$ (MeSi(OMe)$_2$O$_{1/2}$)$_{0.11}$ with Mw=3000 g/mol, Mn=1500 g/mol and Mw/Mn=2.0;

(Si(OEt)$_2$O$_{2/2}$)$_{0.42}$(Si(OEt)O$_{3/2}$)$_{0.19}$(Si(OEt)$_3$O$_{1/2}$)$_{0.39}$ with Mw=1000 g/mol, Mn=800 g/mol and Mw/Mn=1.2;

(Si(OEt)$_2$O$_{2/2}$)$_{0.48}$(Si(OEt)O$_{3/2}$)$_{0.35}$(Si(OEt)$_3$O$_{1/2}$)$_{0.09}$ (SiO$_{4/2}$)$_{0.08}$ with Mw=1400 g/mol, Mn=900 g/mol and Mw/Mn=1.6;

(MeSiO$_{3/2}$)$_{0.23}$(i-OctSiO$_{3/2}$)$_{0.06}$(MeSi(OMe)O$_{2/2}$)$_{0.35}$ (i-OctSi(OMe)O$_{2/2}$)$_{0.09}$(MeSi(OEt)$_2$O$_{1/2}$)$_{0.19}$(i-OctSi(OEt)$_2$O$_{1/2}$)$_{0.08}$ with Mw=1400 g/mol, Mn=600 g/mol and Mw/Mn=2.3; and (MeSiO$_{3/2}$)$_{0.22}$(i-OctSiO$_{3/2}$)$_{0.05}$(MeSi(OH)O$_{2/2}$)$_{0.01}$ (MeSi(OMe)O$_{2/2}$)$_{0.33}$ (i-OctSi(OMe)O$_{2/2}$)$_{0.11}$(MeSi(OMe)$_2$O$_{1/2}$)$_{0.20}$(i-OctSi(OMe)$_2$O$_{1/2}$)$_{0.08}$ with Mw=1500 g/mol, Mn=650 g/mol and Mw/Mn=2.3; where Me is the methyl radical, Vi is the vinyl radical, Et is the ethyl radical, i-Oct is 2,4,4-trimethylpentyl radical, and Ph is the phenyl radical.

The methyl-phenyl silicone resin used in the examples below ismethoxyfunctional methyl-phenyl polysiloxane with kinematic viscosity of 280 mm$^2$/s at 25° C., alkoxy content about 15 wt. %, kinematic viscosity 280 mm$^2$/s at 25° C. measured according to DIN 51562, and total silicone content about 84 wt. %.

The emulsions may further comprise a long chain alkylalkoxysilanes. Long chain meaning a relatively long chain of atoms, preferably C$_8$ to C$_{30}$, more preferably C$_{12}$ to C$_{30}$. Further examples of component B, with a+b+c=4, are n-octyltrimethoxysilane, n-octyltriethoxysilane, 2,4,4-trimethylpentyltrimethoxysilane, 2,4,4-trimethylpentyltriethoxysilane, hexadecyltrimethoxysilane, hexadecyltriethoxysilane, n-nonacosyltriethoxysilane, n-nonacosyltrimethoxysilane, n-triacontyltrimethoxysilane, and n-triacontyltriethoxysilane, hexadecylmethyldimethoxysilane, hexadecylmethyldiethoxysilane, 2,4,4-(trimethyl-pentyl)methyldimethoxysilane, 2,4,4-(trimethyl-pentyl)methyldiethoxysilane, n-octylmethylditrimethoxysilane, and n-octylmethyldiethoxysilane.

Component (C), the emulsifier, may be any suitable ionic emulsifier, nonionic emulsifier, Gemini emulsifier, or amphotropic emulsifier, individually and in the form of mixtures of different emulsifiers. The emulsifier may be used in pure form or as solutions of one or more emulsifiers in water or organic solvents.

Examples of suitable anionic emulsifiers are as follows:

Alkyl sulfates, particularly those having a chain length of 8 to 18 carbon atoms, alkyl and alkaryl ether sulfates having 8 to 18 carbon atoms in the hydrophobic radical and 1 to 40 ethylene oxide (EO) and/or propylene oxide (PO) units.

Sulfonates, particularly alkylsulfonates having 8 to 18 carbon atoms, alkylarylsulfonates having 8 to 18 carbon atoms, taurides, esters, including monoesters, of sulfosuccinic acid with monohydric alcohols or alkylphenols having from 4 to 15 carbon atoms; if desired, these alcohols or alkylphenols may also have been ethoxylated with 1 to 40 EO units.

Alkali metal salts and ammonium salts of carboxylic acids having 8 to 20 carbon atoms in the alkyl, aryl, alkaryl, or aralkyl radical.

Phosphoric acid partial esters and their alkali metal salts and ammonium salts, particularly alkyl and alkaryl phosphates having 8 to 20 carbon atoms in the organic radical, alkyl ether phosphates and alkylaryl ether phosphates having 8 to 20 carbon atoms in the alkyl or alkaryl radical and 1 to 40 EO units.

Examples of nonionic emulsifiers are as follows:

Polyvinyl alcohol still containing about 5-50%, preferably about 8-20%, of vinyl acetate units, with a degree of polymerization of 500 to 3000.

Alkyl polyglycol ethers, preferably those having 3 to 40 EO units and alkyl radicals of 8 to 20 carbon atoms.

Alkylaryl polyglycol ethers, preferably those having 5 to 40 EO units and 8 to 20 carbon atoms in the alkyl and aryl radicals.

Ethylene oxide/propylene oxide (EO/PO) block copolymers, preferably those having 8 to 40 EO/PO units.

Adducts of alkylamines having alkyl radicals of 8 to 22 carbon atoms with ethylene oxide or propylene oxide.

Fatty acids having 6 to 24 carbon atoms.

Alkylpolyglycosides of the general formula R*—O—Z$_o$, in which R* is a linear or branched, saturated or unsaturated alkyl radical having on average 8-24 carbon atoms and Z$_o$ is an oligoglycoside residue containing on average o=1-10 hexose or pentose units or mixtures thereof.

Natural substances and derivatives thereof, such as lecithin, lanolin, saponins, cellulose; cellulose alkyl ethers and carboxyalkylcelluloses whose alkyl groups each possess up to 4 carbon atoms.

Linear organo(poly)siloxane-containing polar groups containing in particular the elements O, N, C, S, P, Si, especially those having alkoxy groups with up to 24 carbon atoms and/or up to 40 EO and/or PO groups.

Examples of cationic emulsifiers are as follows:

Salts of primary, secondary, and tertiary fatty amines having 8 to 24 carbon atoms with acetic acid, sulfuric acid, hydrochloric acid, and phosphoric acids.

Quaternary alkylammonium and alkylbenzeneammonium salts, especially those whose alkyl groups possess 6 to 24 carbon atoms, particularly the halides, sulfates, phosphates, and acetates.

Alkylpyridinium, alkylimidazolinium, and alkyloxazolinium salts, especially those whose alkyl chain possesses up to 18 carbon atoms, particularly the halides, sulfates, phosphates, and acetates.

Especially preferred is a combination of surfactants with at least one emulsifier having more than 16 EO units.

Specific examples of useful emulsifiers include nonioninc secondary alcohol ethoxylates such as ethoxylated isotridecanol, ethoxylated castor oil, an ethoxylated nonionic emulsifier made from a saturated iso-C13 alcohol, octylphenol ethoxylate, the like, or a combination thereof, especially a blend of ethoxylated castor oil blended with an ethoxylated nonionic emulsifier made from a saturated iso-C13 alcohol. The wt % of the emulsifier may be about 1-15% of the total formulation weight; more preferably about 2-10%, most preferably about 4%.

Non-limiting examples of optional catalysts, component (E), are all known condensation catalysts such as metal compounds such as aluminum (III) neodecanoate, aluminum (III) stearate, aluminum (III) ethoxide, aluminum (III) octoate, aluminum (III) ethylhexanoate, aluminum (III) propoxide, aluminum (III) butoxide, aluminum (III) acetylacetonate, aluminum (III)-(9-octadecenylacetoacetate) diisopropoxide, zinc (II) stearate, zinc (II) octoate, zinc (II)-(2-ethylhexanoate), zinc (II)-(acetylacetonate), zinc (II)-bis-(2,2,6,6-tetramethyl-3,5-heptandionate), strontium (II)-(2-ethylhexanoate), titanium (IV)-bis (ethylacetoacetato)-bis (isobutanolato), titanium (IV)-(n-butoxide), titanium (IV)-(t-butoxide), zirconium (IV) acetylacetonate, zirconium (IV)-(2-ethylhexanoate), zirconium (IV) lactate, lithium (I)-octanoate, bismuth (III) neodecanoate, dioctyltin (IV) laurate, dibutyltin (IV) laurate, dimethyltin (IV) laurate, dioctyltin (IV) oxide, dibutyltin (IV) oxide, dimethyltin (IV) oxide, dioctyltin (IV) acetate, dibutyl tin (IV) acetate, a compound available by reaction of dioctyltin (IV) acetate with tetraethoxysilane, a composition available by reaction of dibutyltin (IV) acetate with tetraethoxysilane, tin (II) octoate, lead (II) acetate, lead (II) octoate, lead (II) oxide, lead (II) sulfide, lead (II) carbonate, nickel (II) acetylacetonate, nickel (II) acetate, nickel (II) octoate, nickel (II) carbonate, cobalt (II) octoate, cobalt (II) carbonate, manganese (II) octoate, manganese (II) carbonate, manganese (IV) oxide; acids such as carboxylic acids, dicarboxylic acids, organophosphoric acid, and their mono- and di-esters, phosphonic acids and their monoesters and diorganophosphine acids, boric acid, boron (III) fluoride, ammonium salts of carboxylic acids and anhydrides; bases such as alkali and alkaline earth metal hydroxide, alkali and earth alkali metal and butyllithium; amines such as triorganyloxyamine, monoorganylamine, diorganylamine (cyclic systems such as piperidine, piperazine (1,4-diazacyclohexane), pyrrolidine, homopiperazine (1,4-diazepane), 7-azabicyclo[2.2.1]heptanes, or bispidine), triorganylamine (and DABCO (1,4-diazabicyclo[2.2.2]octane)), 4,5-dihydro-1H-imidazole, 2-organyl-4,5-dihydro-1H-imidazole, 1,4-diazabicyclo[2.2.2]octane, possibly in combination with zinc chelate, and organylamidine, 1,4,5,6-tetrahydropyrimidine, 2-organyl-1,4,5,6-tetrahydropyrimidine, 1,5-diazabicyclo[4.3.0]non-5-ene, 1,8-diazabicyclo[5.4.0]undec-7-ene, 1,5,7-triazabicyclo[4.4.0]dec-5-ene, 7-methyl-1,5,7-triazabicyclo[4.4.0]dec-5-ene, aminomethanamidine, 1-methyl guanidine, N,N'-dimethylguanidine, N,N,N',N'-tetramethylguanidine, N,N,N',N'-tetramethyl-N"-aryl-guanidine, N,N,N',N'-tetramethyl-N"-[4-morpholinyl-(phenylimino)methyl]guanidine, 1-methyl-3-nitro guanidine, 1.8-bis(tetramethylguanidino) naphthalene and guanylguanidine, 1-methylguanylguanidine.

Fillers, component (F), may be any fillers mentioned above.

In addition, non-limiting examples of additives, component (G) such as pigments, stabilizers, preservatives, used in the emulsions of the present invention include any additives mention above. Specific examples of additives useful in the present application include polyisobutylene, poly(propylene glycol) as a plasticizer, or N-dimethoxy(methyl)silylmethyl-O-methyl-carbamate to prevent premature curing.

Additionally, reactive aminofluids may be used in the emulsions. A specific example of an aminofluid useful in the present application includes a reactive aminoethyl-aminopropylfunctional polydimethylsiloxane.

A method of preparation of exemplary elastomeric silicone emulsions of the general formula described above is provided in Examples 1-12 below.

Example 1

Preparation of a Dimethoxy(Methyl)Silylmethylcarbamate-Terminated Polyether Emulsion An emulsion was prepared according to the following method utilizing the following compositions and weight percentages.

| INCI Name | Amount (wt. %) | Amount (g) |
| --- | --- | --- |
| dimethoxymethyl-silylmethylcarbamate-terminated polyether | 52.52 | 210.1 |
| ethoxylated isotridecanol | 4.37 | 17.5 |
| water, pre-blended | 4.37 | 17.5 |
| deionized water | 38.76 | 155 |
| Total | 100.00 | 400.0 |

The emulsion in Example 1 was prepared by the following steps:

An emulsifier, ethoxylated isotridecanol, was mixed with pre-blended water on Turrax® mixer until a foamy meringue was formed. Dimethoxy(methyl)silylmethylcarbamate-terminated polyether was mixed into the meringue at about 10,000 rpm for about 4 minutes. Deionized water was added at about 5000 rpm for about 1 minute. Additional deionized water was added at about 5000 rpm for about 1 minute. Subsequently, additional deionized water was added at about 5000 rpm for about 1 minute.

Tensile strength and elongation of Example 1 emulsion was measured using a method referenced in ASTM D 2370 on a 75 mm×13 mm specimen shape; grip separation was 2.54 cm (1.0 inch) and cross-head speed was set at 0.042 cm/s (1.0 inch/minute). Tensile strength of Example 1 emulsion was measured to be 599.84 kPa (87 psi), elongation was measured to be 40%.

Example 2

Preparation of an Emulsion from a Blend of Dimethoxy(Methyl)Silylmethylcarbamate-Terminated Polyether with Methoxyfunctional Methyl-Phenyl Polysiloxane An emulsion was prepared as in Example 1 according to the method described above utilizing the following compositions and weight percentages. A pre-mixed polymer blend of dimethoxy(methyl)silylmethylcarbamate-terminated polyether with methoxyfunctional methyl-phenyl polysiloxane was prepared instead of dimethoxy(methyl)silylmethylcarbamate-terminated polyether alone.

| | INCI Name | Amount (wt. %) | Amount (g) |
| --- | --- | --- | --- |
| pre-mixed polymer blend | dimethoxymethylsilyl-methylcarbamate-terminated polyether | 33.35 | 69.93 |
| | methoxyfunctional methyl-phenyl polysiloxane | 66.65 | 139.86 |
| | ethoxylated isotridecanol | 4.37 | 17.5 |
| | water, pre-blended | 4.37 | 17.5 |
| | pre-mixed polymer blend | 52.52 | 210.1 |
| | deionized water | 38.74 | 155.0 |
| | Total | 400.00 | 100.0 |

Tensile strength and elongation of Example 2 emulsion was measured using a method referenced in ASTM D 2370 on a 75 mm×13 mm specimen shape; grip separation was 2.54 cm (1.0 inch) and cross-head speed was set at 0.042 cm/s (1.0 inch/minute). Tensile strength of Example 2 emulsion was measured to be 186.158 kPa (27 psi), elongation was measured to be 172%.

An emulsion with substantially the same properties can be prepared as in Example 1 and Example 2 according to the method described above, utilizing an alternative emulsifier such as an ethoxylated castor oil blended with an ethoxylated nonionic surfactant made from a saturated iso-C13 alcohol conforming to the structural formula:

$$RO(CH_2CH_2O)_xH,$$

wherein:
R represents iso-$C_{13}H_{27}$,
x=a range from 1-20, preferably 5-16.

An exemplary emulsifier which can be used in the emulsions of the present invention, and specifically in emulsions of Examples 1 and 2, instead of ethoxylated isotridecanol can be prepared as follows:

| INCI Name | Amount (wt. %) | Amount (g) |
|---|---|---|
| castor oil ethoxylated with 200 EO units | 70.96 | 26.86 |
| ethoxylated nonionic surfactant made from a saturated iso-C13 alcohol | 29.04 | 10.99 |
| Total | 100.00 | 37.85 |

Emulsions of the present invention are useful for one-part and two-part systems. Incorporating the emulsions into a paint or a coating results in increased flexibility and elastomeric properties of the paint or coating, which decreases cracking of the painted substrate and increases long term visual appearance and longevity of the paint or coating. Additionally, the paint or coating gains excellent water repellency, protecting the substrate from moisture.

Additionally, a paint or coating modified with the emulsions of the present invention may be applied to a variety of substrates such as concrete, metal, or wood. The modified paint may be applied in one or more layers and is suitable for overcoating applications. The modified paints or coatings are substantially tack-free, exhibit fast absorption, easy application to a substrate, no dewetting problems after application of a second coat, and dryness to the touch after application. The modified paint or coatings may be also utilized as effective anti-graffiti material applied on a concrete, masonry, natural stone, or a similar substrate.

To measure effectiveness of the emulsions of Examples 1 and 2, examples of an elastomeric paint with and without catalysts were prepared to which emulsions from Examples 1 and 2 were added.

The following components were used during preparation of paint Examples A-I, the paint being a PVC paint for various substrates to which either Example 1 emulsion or Example 2 emulsion was added. The emulsion from Example 1 or 2 was not added to a control sample and Comparative Example E. Amounts are given in grams.

| No. | Name | Trade Name | Control | Examples A, F | Examples B, G | Examples C, H | Examples D, I | Comparative Example E |
|---|---|---|---|---|---|---|---|---|
| 1 | water | | 122 | 122 | 122 | 122 | 122 | 122 |
| 2 | hydrophobic copolymer polyelectrolyte | Tamol 165 A | 0.8 | 0.8 | 0.8 | 0.8 | 0.8 | 0.8 |
| 3 | potassium sodiumphosphate | | 0.8 | 0.8 | 0.8 | 0.8 | 0.8 | 0.8 |
| 4 | 1,2-benzisothiazolin-3-one | Proxel GXL | 0.8 | 0.8 | 0.8 | 0.8 | 0.8 | 0.8 |
| 5 | dichloroctyliso thiazolone | Rozone 2000 | 4 | 4 | 4 | 4 | 4 | 4 |
| 6 | modified hydroxyethyl methyl cellulose | Walocel XM 6000 PV | 2 | 2 | 2 | 2 | 2 | 2 |
| 7 | modified polyol | DF1760 | 1.2 | 1.2 | 1.2 | 1.2 | 1.2 | 1.2 |
| 8 | ester alcohol | Texanol | 4 | 4 | 4 | 4 | 4 | 4 |
| 9 | titanium dioxide | R 706 | 48 | 48 | 48 | 48 | 48 | 48 |
| 10 | calcium carbonate | Omyacarb 6-PT | 94 | 94 | 94 | 94 | 94 | 94 |
| 11 | talc | Talc 503 | 20 | 20 | 20 | 20 | 20 | 20 |
| 12 | talc | BT2203 | 20 | 20 | 20 | 20 | 20 | 20 |
| 13 | emulsion | Wacker BS 45 (53% NV) | 40 | 0 | 0 | 0 | 0 | 0 |
| 14 | emulsion | Wacker BS 1306 (55%) | 4 | 4 | 4 | 0 | 0 | 0 |
| 15 | Example 1 emulsion | | 0 | 50 | 0 | 82 | 0 | 0 |
| 15 | Example 2 emulsion | | 0 | 0 | 50 | 0 | 82 | 0 |
| 16 | sodium hydroxide (10%) | | 0.4 | 0.4 | 0.4 | 0.4 | 0.4 | 0.4 |
| 17 | styrene acrylic | Acronal 296D | 38 | 28 | 28 | 0 | 0 | 82 |
| | Total | | 400 | 400 | 400 | 400 | 400 | 400 |

A blend of catalysts was added to Examples F-I; amounts are given in grams of catalyst/40 grams of paint:

| Catalyst Name | Example F | Example G | Example H | Example I |
|---|---|---|---|---|
| N-(2-aminoethyl)-3-aminopropyltrimethoxysilane used at a rate of 0.1 up to 2% post addition | 0.0825 | 0.0825 | 0.335 | 0.335 |
| 5% aqueous acetic acid in water used at a rate of 0.1 up to 2% post addition | 0.0825 | 0.0825 | 0.335 | 0.335 |

The following steps were taken to prepare Examples A-D, F-I, and Comparative Example E:

Components Nos. 1-4 and 7 were weighed and placed in a mixing container, then placed under a Dispermat® mixer and mixed at about 1000 rpm on the Dispermat® mixer, which was set up with a cooling jacket. The cooling jacket decreased emulsion breaking due to heat building up during the grind portion of the process. Component no. 6 was weighed into a separate container and slowly added to the mixture, mixed for approximately 15 minutes or until thickened. While components 1-4, 6, and 7 were being mixed, components nos. 9-12 were weighed into the same container, mixed together, and added to the mixture one spoonful at a time until all the dry components were mixed into the mixture. Maintaining a steady pace of adding the dry components allowed for a smoother grind. The Dispermat® mixer was turned up to about 4000 rpm and mixed for 15 minutes. The speed was adjusted as needed. It proved to be desirable to increase the speed gradually to create heat which helped disperse the components. While waiting for the dry components to blend, components nos. 13 and/or 14 and/or 15 were weighed into separate containers, the Dispermat® mixer was turned down to about 2000 rpm and components nos. 13 and/or 14 and/or 15 were added and mixed for 5-10 minutes. Component no. 16 was added and the mixture mixed for 5 minutes. Component no. 17 was weighed, the Dispermat® mixer was turned down to about 1000 rpm, and component no. 17 was added to the mix, the mixture was mixed for about 5-10 minutes. Component no. 5 was weighed, added to the mix, the mixture was mixed for about 5 minutes. The resulting paint formulation was labeled and poured into a cooling container for storage. Before painting a surface of a substrate with the paint formulation, the catalyst was added to Examples F-I, as was described above. Examples A-D, F-I, and Comparative Example E were then applied to concrete and aluminum Q panels.

Examples A-D and Comparative Example E have no catalyst added; examples A-E represent a stable, one part system. Examples F-I had catalyst post added to the paint system; examples F-I represent a two part system with short pot life of less than one hour. All Examples A-D, F-I, and Comparative Example E represent paint which cures at room temperature.

The following tests were conducted on Examples A-D, F-I, and Comparative Example E to test cracking of the painted substrate, long term visual appearance, longevity of the paint or coating, and water repellency: Mandrel Bend test was conducted on aluminum Q panels; water absorption was assessed for concrete panels, water absorption of concrete panels coated for exterior exposure was assessed, color QUV was monitored to observe change in color, color QUV was also assessed for outdoor exposure.

The Mandrel Bend test is a test for flexibility and cracking, utilizing a method referenced in ASTM D522-93a. Paint Examples A-D, F-I, and Comparative Example E were applied to bare aluminum panels measuring 7.62×15.24 cm (3×6 inches). The panels were allowed to dry 48 hours before testing was conducted. The panels were placed vertically in the test apparatus, clamped tight, and the bending action was performed with a one second time limit. The results are presented in the table below. Pass denotes that no cracking appeared during the test, fail would denote that cracking appeared during the test. All Examples A-D, F-I, and Comparative Example E passed.

Results of the Mandrel Bend test on aluminum Q panels with which the paint Examples A-D, F-I, and Comparative Example E, were applied to:

| Paint Example | Results |
|---|---|
| Control | Pass |
| A-D, F-I | Pass |
| Comparative Example E | Pass |

Water absorption was measured using testing method ASTM D 5401. The water absorption data was collected for concrete panels measuring 7.62×15.24 cm (3×6 inches) to which paint Examples A-D, F-I, and Comparative Example E were applied. The data was collected after 1 h, 6 h, 24 h, 239 h, 500 h, 786 h, 1000 h, 1500 h, 2000 h, and 2500 h after the application. Examples A2, A3, D2, D3, F2, F3, I2, and I3 showed water penetration through concrete at 6 hours. Water absorption of Examples A-D and F-I in general was comparable to acrylics and/or silicones.

Water absorption was also assessed using ASTM D5401 for which concrete panels measuring 10.16×30.48 cm (4×12 inches) were coated with paint Examples A-D, F-I, and Comparative Example E for exterior testing under Michigan natural climatic conditions. The water absorption was measured after initial application and 5 months post-application. At 5 months assessment, paint example D1 showed water penetration through concrete within 24 hours, examples D2 and D3 appeared chalky, examples F2 and F3 started to disintegrate but remained intact with a bottom inch soaked through after 1 hour, example G2 started to disintegrate but remained intact with a bottom half inch soaked through after 1 hour, example G3 started to disintegrate but remained intact. The remaining examples showed water absorption comparable to acrylics and/or silicones.

Color QUV was monitored with BYK colorimeter to observe the change in color after each cycle. Visual assessment was also done on concrete panels measuring 7.62×15.24 cm (3×6 inches). While the elastomeric silicone emulsions (Examples A-D, F-I) showed minimal change in color, Comparative Example E, the acrylic, exhibited yellowing effect. Examples A-D and F-I thus showed superior color retention compared to acrylics. The results are summarized in the table below.

Results of the Color QUV test on concrete panels to which the paint Examples A-D, F-I, and Comparative Example E were applied:

| Paint | Difference | | | Initial measurement to 2500 hours |
|---|---|---|---|---|
| Example | ΔL* | Δa* | Δb* | ΔGloss |
| Control 1 | 0.04 | −0.09 | −0.12 | −0.15 |
| Control 2 | 0.29 | −0.37 | −1.14 | −0.31 |
| Control 3 | 0.47 | −0.36 | −1.09 | −0.61 |
| A1 | −0.81 | −0.39 | −0.42 | −1.22 |
| A2 | −0.79 | −0.40 | −0.43 | −0.32 |
| A3 | −0.93 | −0.40 | −0.45 | −0.39 |
| B1 | 0.08 | −0.16 | −0.04 | −0.43 |
| B2 | 0.55 | −0.25 | −1.25 | −0.60 |
| B3 | 0.39 | −0.28 | −1.14 | −0.31 |
| C1-3 were removed from testing | | | | |
| D1 | −0.24 | −0.12 | −0.05 | −0.36 |
| D2 | 0.21 | −0.11 | −0.54 | −0.16 |
| D3 | 0.16 | −0.07 | −0.13 | −0.30 |
| E1 | 0.11 | −0.31 | −0.65 | −0.20 |
| E2 | 1.81 | −0.79 | −2.53 | −0.52 |
| E3 | 1.93 | −0.73 | −2.29 | −0.31 |
| F1 | −1.19 | −0.44 | −0.44 | −0.37 |
| F2 | −1.60 | −1.98 | −1.98 | −0.08 |
| F3 | −1.75 | −2.19 | −2.19 | −0.25 |
| G1 | −0.39 | 0.32 | 0.32 | −0.35 |
| G2 | −0.43 | −1.35 | −1.35 | −0.37 |
| G3 | −0.68 | −1.52 | −1.52 | −0.27 |
| H1-3 were removed from testing | | | | |
| I1-3 were removed from testing | | | | | wherein:
L* indicates lightness/darkness; L* = 0 yields black and L* = 100 indicates diffuse white; a positive ΔL value is lighter and a negative value is darker;
a* indicates red/green; a positive Δa value is redder and a negative value is greener; and
b* indicates yellow/blue; a positive Δb value is yellower and a negative value is blue.

Examples 3-7

Preparation of Additional Useful Exemplary Emulsions

Additional exemplary useful emulsions of Examples 3-7 were prepared according to the method described above, utilizing the following components and weight percentages:

Example 3

| | INCI Name | Amount (wt. %) | Amount (g) |
|---|---|---|---|
| pre-mixed polymer blend | methoxyfunctional methyl-phenyl polysiloxane | 40.00 | 84.00 |
| | dimethoxymethylsilylmethyl-carbamate-terminated polyether | 60.00 | 126.00 |
| | water, pre-blend | 4.37 | 17.37 |
| | ethoxylated isotridecanol | 4.37 | 17.37 |
| | pre-mixed polymer blend | 52.52 | 208.77 |
| | water, DI | 39.38 | 156.53 |
| | Totals | 100.64 | 400.04 |

Example 4

| | INCI Name | Amount (wt. %) | Amount (g) |
|---|---|---|---|
| pre-mixed polymer blend | hexadecyltrimethoxysilane | 40.00 | 84.00 |
| | polyisobutylene | 20.00 | 42.00 |
| | dimethoxymethylsilyl-methylcarbamate-terminated polyether | 40.00 | 84.00 |
| | water, pre-blend | 4.37 | 17.37 |
| | ethoxylated isotridecanol | 4.37 | 17.37 |
| | pre-mixed polymer blend | 52.52 | 208.77 |
| | water, DI | 29.38 | 156.53 |
| | Totals | 100.64 | 400.04 |

Example 5

| | INCI Name | Amount (wt. %) | Amount (g) |
|---|---|---|---|
| pre-mixed polymer blend | hexadecyltrimethoxysilane | 50 | 107.5 |
| | dimethoxymethylsilyl-methylcarbamate-terminated polyether | 50 | 107.5 |
| | water, pre-blend | 4.4 | 17.4 |
| | ethoxylated isotridecanol | 4.4 | 17.4 |
| | pre-mixed polymer blend | 52.52 | 208.8 |
| | water, DI | 39.34 | 156.5 |
| | Totals | 100.65 | 400.08 |

Analytical data for Example 5 are as follows:

| Product | Solids (%) | Density (g/mL) | % Water | VOC (lb/gal) | VOC (g/L) |
|---|---|---|---|---|---|
| Example 5 emulsion | 52.1 | 0.97 | 45.1 | 0.23 | 27.56 |

Example 6

| | INCI Name | Amount (wt. %) | Amount (g) |
|---|---|---|---|
| pre-mixed polymer blend | hexadecyltrimethoxysilane | 43.5 | 93.6 |
| | dimethoxymethylsilylmethylcarbamate-terminated polyether | 37.0 | 79.6 |
| | dimethoxymethylsilylmethylcarbamate-terminated polyether 2 | 18.5 | 39.8 |
| | N-dimethoxymethylsilylmethyl-O-methyl-carbamate | 0.9 | 2.0 |
| | water, pre-blend | 4.4 | 17.4 |
| | ethoxylated isotridecanol | 4.4 | 17.4 |
| | pre-mixed polymer blend | 52.5 | 208.8 |
| | water, DI | 39.5 | 156.6 |
| | Totals | 100.6 | 400.0 |

Example 7

| | INCI Name | Amount (wt. %) | Amount (g) |
|---|---|---|---|
| pre-mixed polymer blend | poly(propylene glycol) | 16.00 | 30.12 |
| | hexadecyltrimethoxysilane | 39.00 | 72.89 |
| | dimethoxymethylsilylmethylcarbamate-terminated polyether | 29.00 | 55.29 |
| | dimethoxymethylsilylmethylcarbamate-terminated polyether 2 | 15.00 | 27.45 |

-continued

| INCI Name | Amount (wt. %) | Amount (g) |
|---|---|---|
| N-dimethoxymethylsilylmethyl-O-methyl-carbamate | 1.00 | 2.26 |
| water, pre-blend | 4.37 | 15.30 |
| octylphenol etoxylate | 3.80 | 13.30 |
| ethoxylated nonionic surfactant made from a saturated iso-C13 alcohol | 0.60 | 2.10 |
| pre-mixed polymer blend | 52.5 | 181.48 |
| water, DI | 39.38 | 156.53 |
| Totals | 100.00 | 350.00 |

To assess usefulness of the emulsions as paint or coating modifiers in a two-part system, 70 wt. % of each emulsion of Examples 3-7 was mixed with 30 wt. % of calcium carbonate, a combination of catalyst consisting of a catalyst with tin content of 15.5-17.5 wt. % (Trade name: Reaxis C333W50) and N-(2-aminoethyl)-3-aminopropyltrimethoxysilane was post added, the emulsions were then applied to a release paper at 50 mm thickness. The Examples 3-7 were assessed after 7 days of dry time at 77% humidity and 21.1° C. (70° F.) in the laboratory for dryness, tackiness, and tensile strength and elongation was measured. Examples 3-7 were dry to the touch, exhibited no tackiness, good tensile, and elongation. See the test results below.

| Example No. | Dry Time 7 Days | Durometer A | Tensile (kPa) | Elongation (%) | Film Thickness (mm) |
|---|---|---|---|---|---|
| 3 | dry, no tack | 70 | 2048 | 178 | 0.762 |
| 4 | dry, no tack | 60 | 945 | 10.8 | 0.889 |
| 5 | dry, no tack | 45 | 1427 | 37.08 | 0.635 |
| 6 | dry, no tack | 75 | 1565 | 12 | 0.889 |
| 7 | dry, no tack | 70 | 862/1606 | 9.1/6.2 | 0.635 |

Examples 8-17

Preparation of Additional Exemplary Emulsions

Additional exemplary emulsions of Examples 8-17 were prepared according to the method described above utilizing the following components and weight percentages:

Example 8

| | INCI Name | Amount (wt. %) | Amount (g) |
|---|---|---|---|
| pre-mixed polymer blend | methoxyfunctional methyl-phenyl polysiloxane | 40.00 | 83.52 |
| | dimethoxymethylsilylmethylcarbamate-terminated polyether | 60.00 | 124.80 |
| | water, pre-blend | 4.37 | 17.37 |
| | ethoxylated isotridecanol | 4.37 | 17.37 |
| | pre-mixed polymer blend | 52.52 | 208.77 |
| | water, DI | 39.38 | 156.53 |
| | Totals | 100.64 | 400.04 |

Example 9

| | INCI Name | Amount (wt. %) | Amount (g) |
|---|---|---|---|
| pre-mixed polymer blend | methoxyfunctional methyl-phenyl polysiloxane | 40.00 | 84.0 |
| | dimethoxymethylsilylmethylcarbamate-terminated polyether | 60.00 | 126.0 |
| | water, pre-blend | 4.4 | 17.4 |
| | ethoxylated isotridecanol | 4.4 | 17.4 |
| | pre-mixed polymer blend | 52.5 | 208.8 |
| | water, DI | 39.5 | 156.6 |
| | Totals | 100.6 | 400.0 |

Example 10

| | INCI Name | Amount (wt. %) | Amount (g) |
|---|---|---|---|
| pre-mixed polymer blend | hexadecyltrimethoxysilane | 40.00 | 84.00 |
| | dimethoxymethylsilylmethylcarbamate-terminated polyether | 60.00 | 126.00 |
| | water, pre-blend | 4.37 | 17.37 |
| | ethoxylated isotridecanol | 2.18 | 8.67 |
| | octylphenol etoxylate | 2.20 | 8.75 |
| | pre-mixed polymer blend | 52.52 | 208.77 |
| | water, DI | 39.39 | 156.53 |
| | Totals | 100.65 | 400.08 |

Example 11

| | INCI Name | Amount (wt. %) | Amount (g) |
|---|---|---|---|
| pre-mixed polymer blend | graphite | 40.00 | 84.00 |
| | dimethoxymethylsilylmethylcarbamate-terminated polyether | 60.00 | 126.00 |
| | water, pre-blend | 4.4 | 17.4 |
| | ethoxylated isotridecanol | 4.4 | 17.4 |
| | pre-mixed polymer blend | 52.5 | 208.8 |
| | water, DI | 39.5 | 156.6 |
| | Totals | 100.6 | 400.0 |

Example 12

| | INCI Name | Amount (wt. %) | Amount (g) |
|---|---|---|---|
| pre-mixed polymer blend | graphite | 20.00 | 42.00 |
| | dimethoxymethylsilylmethylcarbamate-terminated polyether | 60.00 | 126.00 |
| | polyisobutylene | 20.00 | 42.00 |
| | water, pre-blend | 4.37 | 17.37 |
| | octylphenol etoxylate | 4.37 | 17.37 |
| | pre-mixed polymer blend | 52.52 | 208.77 |
| | water, DI | 39.39 | 156.53 |
| | Totals | 100.64 | 400.04 |

Example 13

| | INCI Name | Amount (wt. %) | Amount (g) |
|---|---|---|---|
| pre-mixed polymer blend | methoxyfunctional phenyl polysiloxane | 20 | 46 |
| | dimethoxymethylsilylmethylcarbamate-terminated polyether | 80 | 184 |
| | castor oil ethoxylated with 200 EO units | 6.26 | 11.5 |
| | ethoxylated nonionic surfactant made from a saturated iso-C13 alcohol | 2.56 | 11.5 |
| | pre-mixed polymer blend | 50.05 | 225 |
| | water, DI | 39.38 | 184.92 |
| | Totals | 100. | 449.5 |

Analytical data for Example 13 are as follows:

| Product | Solids (%) | Density (g/mL) | % Water | VOC (lb/gal) | VOC (g/L) |
|---|---|---|---|---|---|
| Example 13 emulsion | 55 | 1.03 | 45 | 0 | 0 |

Example 14

| | INCI Name | Amount (wt. %) | Amount (g) |
|---|---|---|---|
| pre-mixed polymer blend | hexadecyltrimethoxysilane | 43.5 | 93.6 |
| | dimethoxymethylsilylmethylcarbamate-terminated polyether | 37.0 | 79.6 |
| | dimethoxymethylsilylmethylcarbamate-terminated polyether 2 | 18.5 | 39.8 |
| | N-dimethoxymethylsilylmethyl-O-methyl-carbamate | 0.9 | 2.0 |
| | water, pre-blend | 4.4 | 17.4 |
| | ethoxylated isotridecanol | 4.4 | 17.4 |
| | pre-mixed polymer blend | 52.5 | 208.8 |
| | water, DI | 39.5 | 156.6 |
| | Totals | 100.6 | 400.0 |

Example 15

| | INCI Name | Amount (wt. %) | Amount (g) |
|---|---|---|---|
| pre-mixed polymer blend | poly(propylene glycol) | 16.00 | 30.12 |
| | hexadecyltrimethoxysilane | 39.00 | 72.89 |
| | dimethoxymethylsilylmethylcarbamate-terminated polyether | 29.00 | 55.29 |
| | dimethoxymethylsilylmethylcarbamate-terminated polyether 2 | 15.00 | 27.45 |
| | N-dimethoxymethylsilylmethyl-O-methyl-carbamate | 1.00 | 2.26 |
| | water, pre-blend | 4.37 | 15.30 |
| | octylphenol ethoxylate | 3.80 | 13.30 |
| | ethoxylated nonionic surfactant made from a saturated iso-C13 alcohol | 0.60 | 2.10 |
| | pre-mixed polymer blend | 51.85 | 181.48 |
| | water, DI | 39.38 | 156.53 |
| | Totals | 100.00 | 350.00 |

Example 16

| | INCI Name | Amount (wt. %) | Amount (g) |
|---|---|---|---|
| pre-mixed polymer blend | glycidoxy functional silicone polymer | 50.0 | 107.5 |
| | hexadecyltrimethoxysilane | 4.6 | 10.00 |
| | a reactive aminoethyl-aminopropylfunctional polydimethylsiloxane | 22.1 | 47.5 |
| | dimethoxymethylsilylmethylcarbamate-terminated polyether | 23.3 | 50.00 |
| | water, pre-blend | 4.4 | 17.4 |
| | ethoxylated isotridecanol | 4.4 | 17.4 |
| | pre-mixed polymer blend | 52.5 | 208.7 |
| | water, DI | 39.5 | 156.6 |
| | Totals | 100.8 | 400.4 |

Example 17

| | INCI Name | Amount (wt. %) | Amount (g) |
|---|---|---|---|
| pre-mixed polymer blend | glycidoxy functional silicone polymer | 37.2 | 80.0 |
| | hexadecyltrimethoxysilane | 4.7 | 10.0 |
| | a reactive aminoethyl-aminopropylfunctional polydimethylsiloxane | 28.0 | 60.0 |
| | dimethoxymethylsilylmethylcarbamate-terminated polyether | 30.2 | 65.0 |
| | water, pre-blend | 4.4 | 17.4 |
| | ethoxylated isotridecanol | 4.4 | 17.4 |
| | pre-mixed polymer blend | 52.5 | 208.7 |
| | water, DI | 39.5 | 156.6 |
| | Totals | 100.8 | 400.4 |

To assess usefulness of the emulsions as paint or coating modifiers in a one-part system, 70 wt. % of each emulsion of Examples 8-17 was mixed with 30 wt. % of calcium carbonate, the emulsions were then applied to a release paper at 50 mm thickness. The Examples 8-17 were assessed after 7 days of dry time at 77% humidity and 21.1° C. (70° F.) in the laboratory for dryness, tackiness and tensile strength and elongation was measured. Examples 8-13, 16, and 17 were dry to the touch, examples 8-12 exhibited slight to moderate tackiness, good tensile, and elongation. Example 15 was not dry; example 14 was dry, but very tacky. The test results for Examples 8-17 are provided in the table below.

| Example No. | Dry Time 7 Days | Durometer A | Tensile (kPa) | Elongation (%) | Film Thickness (mm) |
|---|---|---|---|---|---|
| 8 | dry, slight tacky | 25 | 360 | 376.62 | 0.635 |
| 9 | dry, moderately tacky | 30 | 524 | 641 | 0.508 |
| 10 | dry, slight tacky | 25 | 221 | 118 | 0.508 |
| 11 | dry, slight tacky | 20 | 607 | 196 | 0.508 |
| 12 | dry, moderately tacky | 15 | 110 | 123 | 0.508 |
| 13 | dry, no tack | 25 | 641 | 701.4 | 0.709 |
| 14 | dry, but very tacky | | further data not collected | | |
| 15 | did not dry | | further data not collected | | |
| 16 | dry | 40 | 1069 | 270 | 0.564 |
| 17 | dry | 25 | 872 | 245.4 | 0.635 |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A coating or paint composition comprising:
(A) a silyl-terminated polymer of formula (I)

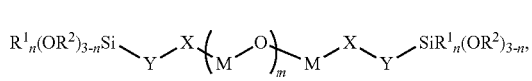

wherein
$R^1$=alkyl or aryl,
$R^2$=$C_1$-$C_{12}$-alkyl, H, or aryl
X=O or $NR^3$,
$R^3$=H, $C_1$-$C_{12}$-alkyl, or aryl,
Y=—$(CH_2)_3$NHC(=O)—, —$CH_2$NHC(=O)—, wherein Y is Si—C bonded
M=independently —$CH_2CH_2$—, —$CH_2CH(CH_3)$—, —$CH_2CH_2CH_2CH_2$—, wherein M is —$CH_2CH(CH_3)$— for ≥60% of all M,
n=0-2,
m=1-500;
(B) a silicon compound containing units of the formula (II)

a=0-3,
b=0-2,
c=0, 1, 2, or 3,
$R^4$=alkyl, aryl, aminoalkyl, glycidoxy alkyl, mercapto alkyl,
$R^5$=alkyl, aryl,
$R^6$=alkyl, H,
with the proviso that a+b+c≤4, corresponding to oligomers, polymers, and silanes;
(C) water;
and optionally:
(D) emulsifier(s);
(E) catalyst(s);
(F) filler(s); and
(G) additive(s).

2. The coating or paint composition of claim 1, wherein $R^1$=methyl radical, $R^2$=methyl or ethyl radicals, X=O, or a combination thereof.

3. The coating or paint composition of claim 1, wherein Y=—$CH_2$NHC(=O) and M=$CH_2CH(CH_3)$—.

4. The coating or paint composition of claim 1, wherein the coating or paint composition contains a water-based binder.

5. The coating or paint composition of claim 1, wherein at least one silyl-terminated polymer is selected from the group consisting of dimethoxy(methyl)silylmethylcarbamate-terminated polyether, trimethoxysilylpropylcarbamate-terminated polyether, or a blend thereof.

6. The coating or paint composition of claim 1, wherein wt. % of the silyl-terminated polymer is about 10-80 wt. % of the total emulsion weight.

7. The coating or paint composition of claim 1 further comprising a long chain alkylalkoxysilane.

8. The coating or paint composition of claim 7, wherein the coating or paint composition is a coating or paint for interior and/or exterior use over masonry, plasters, cellulous, and EIFS substrates.

9. The coating or paint composition of claim 1, wherein the elastomeric silicone emulsion comprises a combination of the silyl-terminated polymer, one or more polysiloxanes, one or more emulsifiers, and water.

10. The coating or paint composition of claim 9, wherein the one or more polysiloxanes comprise methyl and/or phenyl or alkyl substituents with alkoxy functionality.

11. A method of preparing the coating or paint composition of claim 1
(a) mixing an emulsifier with water,
(b) introducing one or more silyl-terminated polymers (A) into the mixture of emulsifier and water, and
(c) introducing a silicon compound (B) into the mixture of emulsifier, water, and silyl-terminated polymer, and
(d) adding more water to the mixture obtained in step (c).

12. The method of claim 11 further comprising a step of mixing the one or more silyl-terminated polymers with one or more polysiloxanes to create a polymer pre-blend.

13. The method of claim 12, wherein the polysiloxanes contain silicon-bound alkoxy groups with methyl and/or phenyl or alkyl substituents.

14. The method of claim 12 further comprising a step of adding the polymer pre-blend into the mixture of the emulsifier with water while mixing at about 4,000-10,000 rpm for about 15 minutes.

15. A method of modifying a coating or paint composition to enhance flexibility and water absorption of the coating or paint comprising adding an elastomeric silicone resin emulsion of claim 1 into the coating or paint.

16. A method of modifying a coating or paint composition to enhance flexibility and water repellency of the coating or paint comprising adding an elastomeric silicone resin emulsion prepared in claim 11 into the coating or paint.

17. The method of claim 15, wherein the coating or paint contains a water-based binder.

18. The method of claim 16, wherein the coating or paint contains a water-based binder.

19. A method of using the coating or paint composition of claim 1 as an anti-graffiti paint or as a modifier for an anti-graffiti paint comprising:
applying the coating or paint composition of claim 1 to a surface as an anti-graffiti paint or
modifying an anti-graffiti paint with the coating or paint composition of claim 1.

20. A method of using the coating or paint composition of claim 1 in a two-component system comprising incorporating the coating or paint composition of claim 1 into a two-component system.

21. The method of claim 11, further comprising step (d) adding one or more catalysts to the coating or paint composition.

* * * * *